United States Patent [19]

Eiben et al.

[11] Patent Number: 4,941,998

[45] Date of Patent: Jul. 17, 1990

[54] METHOD OF WASHING A SOLVENT IN THE REPROCESSING OF IRRADIATED NUCLEAR FUELS

[75] Inventors: Klaus Eiben, Ettlingen; Heinz Evers, Busenberg, both of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 195,272

[22] Filed: May 18, 1988

[30] Foreign Application Priority Data

Jun. 1, 1987 [DE] Fed. Rep. of Germany ....... 3718338

[51] Int. Cl.[5] ....................... G21C 19/42; G21C 19/44; G21F 9/08; B01D 11/00

[52] U.S. Cl. .................................... 252/627; 252/631; 423/8; 423/9; 423/10; 376/310; 376/311

[58] Field of Search ........................ 252/627, 631, 635; 423/9, 10, 8; 376/310, 311

[56] References Cited

U.S. PATENT DOCUMENTS 4,059,671 11/1977 Schmieder ............................ 423/10
4,188,361 2/1980 Rowden .................................. 423/9
4,574,072 3/1986 Horwitz et al. ........................ 423/9
4,595,529 6/1986 Neace .................................. 252/631
4,652,431 3/1987 Worthington et al. ............... 423/10
4,656,011 4/1987 Garraway et al. .................... 423/10
4,758,411 7/1988 Floreancig ............................ 423/10

FOREIGN PATENT DOCUMENTS 2624936 12/1977 Fed. Rep. of Germany .
2449589 9/1984 Fed. Rep. of Germany .
2924458 6/1986 Fed. Rep. of Germany .

OTHER PUBLICATIONS

"Atomkernenergie-Kerntechnik", vol. 35, (1980), pp. 81 to 93 by Franz Baumgärtner.
"Atomwirtschaft", vol. 26, No. 3, Mar. 1981, pp. 199 to 201.

*Primary Examiner*—Howard J. Locker
*Attorney, Agent, or Firm*—Walter Ottesen

[57] ABSTRACT

The invention is directed to a method of washing a solvent in the reprocessing of irradiated nuclear fuel. The solvent is washed with an aqueous solution in a mixer-settler having at least one stage which includes a mixing chamber and a settling chamber. The pH of the dispersion in the mixing chamber is measured and an amount of washing solution is added which influences the pH toward the desired operational value. An apparatus for carrying out the method is also disclosed.

6 Claims, 1 Drawing Sheet

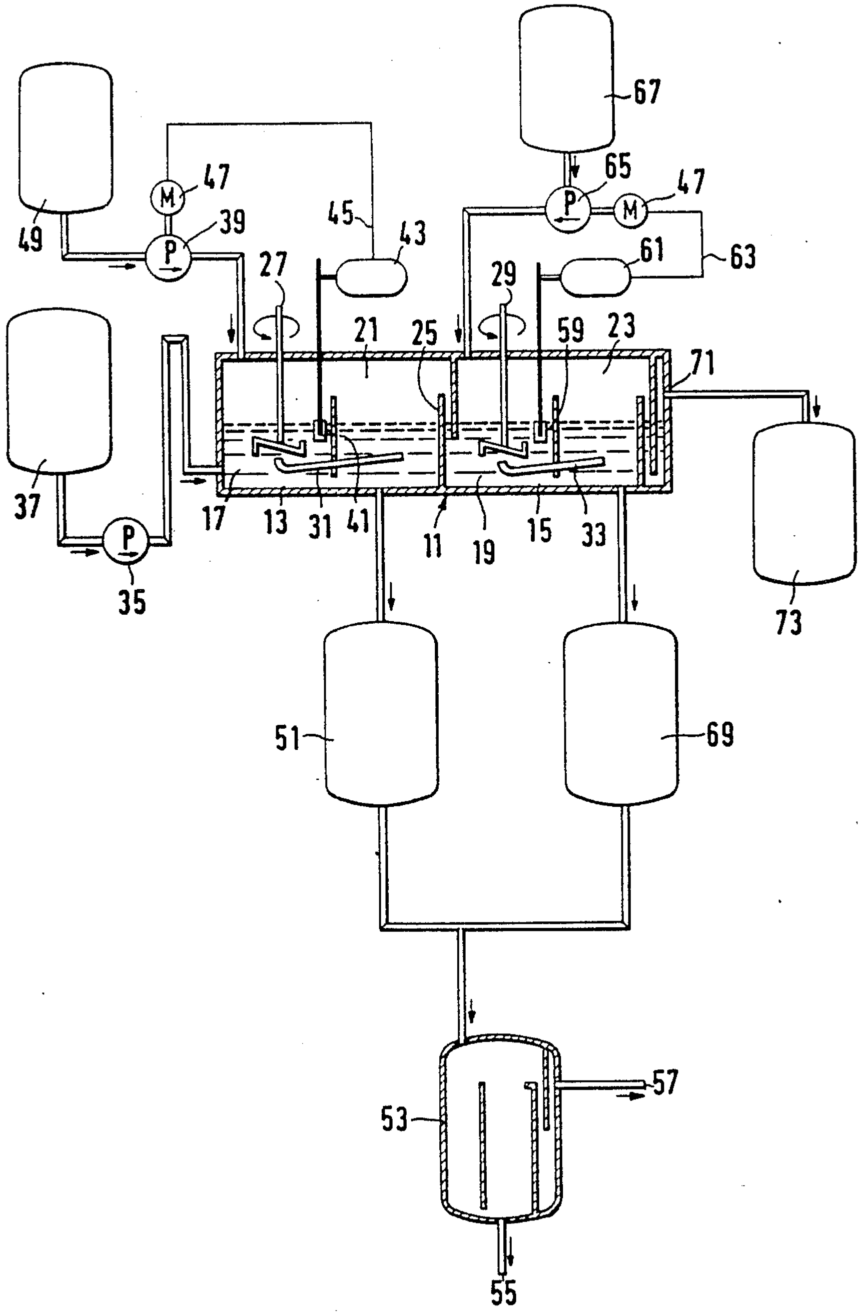
67
65
47
P
M
49
45
43
39
61
63
27
29
21
25
59
23
71
37
17
13
31
41
11
19
15
33
35
73
51
69
53
57
55

METHOD OF WASHING A SOLVENT IN THE REPROCESSING OF IRRADIATED NUCLEAR FUELS

FIELD OF THE INVENTION

The invention relates to a method of washing a solvent in the reprocessing of irradiated nuclear fuels. The solvent is washed in a mixer-settler with an aqueous solution. The mixer-settler has one or more stages. The invention also relates to an apparatus for carrying out the method.

BACKGROUND OF THE INVENTION

The PUREX process has become established in the reprocessing of irradiated nuclear fuels and reference can be made to the journal "Zeitschrift Atomkernenergie—Kerntechnik", volume 35, (1980) issue 2, pages 81 to 93. Page 87 of this issue discloses that organic solvents can be washed to remove the degradation products contained therein. The solvent should be passed in circulation and must therefore pass through this solvent washing. Soluble impurities and decomposition products are removed from the solvent by alkaline washing with sodium carbonate solution. In this connection, reference can be made to "Zeitschrift Atomwirtschaft—Atomtechnik", volume 26, Number 3, March, 1981.

The PUREX process uses an organic solvent (preferably 30 volume percent TBP in dodecane), which is partly hydrolyzed by the contact with acid solutions and is partly decomposed radiolytically by the radioactive radiation during the reprocessing process. These acid decomposition products are washed out by a single-stage and/or multi-stage alkaline/acid washing before recycling of the solvent. Sodium carbonate ($Na_2CO_3$) in the form of an aqueous solution is often used as the washing solution, and as spent washing solution chiefly contributes, after evaporation, to the salt load ($NaNO_3$) of the moderately active waste (MAW) of a reprocessing facility. The alkaline washing solutions do not remain in use until they are neutralized, since otherwise certain metal complex compounds are hydrolyzed and precipitate.

Sodium carbonate solutions or sodium hydroxide solution have usually been chosen as the washing solution for the organic solvent, and have always been introduced in excess, assuming the most unfavorable conditions. It has been found here that only 10% of the washing agent is available for breaking down the degradation products in the organic solvent, since up to 90% is consumed by secondary reactions. These secondary reactions are caused by the entrained acids and heavy metals, such as uranium which are complexed by the sodium carbonate solution and remain in the solution.

A process for solvent washing in which the solvent is washed with an aqueous hydrazine hydrate solution with a molar concentration of the order of 0.1–1.0 is known from German patent publication DE No. 24 49 589 C2. The moderately active waste occurring as a result of the washing solution is thereby said to be reduced by a factor of 100. From the point of view of a reduction in the waste, the solvent washing is subjected to discontinuous checking.

The use of hydrazine hydrate solution has considerable disadvantages for the further processing of the hydrazine waste. An additional process is necessary before evaporation of the aqueous waste. The hydrazine must be destroyed by electrolytic oxidation. This electrolytic oxidation, however, can only be carried out if the hydrazine waste is first rendered strongly acid. The organic phase still present can thereby be separated out. In this solvent washing also, the hydrazine hydrate must be added in excess.

Such solvent washings are predominantly carried out in so-called mixer-settlers. Such mixer-settlers, which can be built up from one or more stages, are known from German patent publications DE-AS No. 26 24 936 and DE-PS No. 29 24 458. It is a characteristic feature of these mixer-settlers that each stage comprises a mixing chamber and a settling chamber in cascade therewith for separating the phases which have been mixed with one another.

SUMMARY OF THE INVENTION

It is an object of the invention to improve a method of the type described above so that it becomes possible to minimize the amount of salt of the moderately active waste resulting from the spent washing solution.

The method of the invention is for washing a solvent in the reprocessing of irradiated nuclear fuels. The method includes the steps of: washing the solvent with an aqueous solution in a mixer-settler having one or more stages; measuring the pH of the dispersion in the mixing chamber of the mixer-settler; and, adding a washing solution or a substance having a washing effect which influences the pH to the desired operational value when the limit value is exceeded or there is a drop below this limit value.

The operational variations in the nature and amount of the decomposition products can be reacted to directly in the course of the reaction by the pH-controlled addition of the washing solution. The addition of the washing agent can be limited to the washing agent actually required. The amount of washing solution or the concentration of the substance effective for washing action in the washing solution is adjusted to the degree of contamination of the washing solution. The pH provides a continuous signal as to the instantaneous washing quality of the washing solution.

The method according to the invention can be used for alkaline washing and also for acid washing. In acid washing, the acid ($HNO_3$) is metered in as washing solution according to the actual requirement indicated by the pH measurement. In alkaline washing, a particular alkalinity range is an indication of the good washing effect of the washing solution. The hydrogen ion concentration in the alkaline solution is very low in order to achieve the alkaline washing effect. In acid washing, the hydrogen ion concentration is very high, which is expressed by the low pH which is sought.

As disclosed in U.S. Pat. No. 4,188,361, it is known from the processing of uranium ore to separate organically extractable uranium complexes in a mixer-settler battery by a pH-controlled addition of a base such as ammonia. This procedure in the neighboring field of processing of uranium ore has still not had any influence in the field of reprocessing of nuclear fuels, even though this technique has been practiced for more than thirty years. A transfer to reprocessing has not been undertaken because of the inaccessibility of the mixer-settlers because of radiation. There are considerable difficulties in maintaining in-line instruments in this area. Ever more value has been placed on the reliable removal of the decomposition products from organic solvents in reprocessing technology with the reduction in the salt load assuming importance and therefore leading to the use of washing agents low in salt, such as hydrazine hydrate. This technical problem is not to be found in U.S. Pat. No. 4,188,361.

In an advantageous embodiment of the invention, the aqueous washing phase from the settling chamber of the mixer-settler is recycled in part in the mixing chamber. A good effect of the solvent washing is achieved by this procedure.

According to another advantageous embodiment of the invention, the internal phase ratio between the solvent and washing solution is adjusted to almost 1:1. The internal phase ratio of 1:1, at which a stable phase situation is present, can be established via the amount of the recycled washing solution. The organic solvent phase to be washed is thereby dispersed and the aqueous washing solution is present as a continuous phase. This stable phase situation prevents the aqueous phase from being carried with the washed organic phase from the settling chamber of the alkaline washing stage into the next washing stage, the latter being usually acid.

The invention also relates to an apparatus for carrying out the method of the invention. The actual requirement of washing agent is determined by the pH measuring probe and the washing agent concentration is thus monitored. If the pH leaves the threshold value range, the requirement of alkaline or acid washing agents is subsequently adjusted by the control loop containing the metering pumps.

In an advantageous embodiment of the apparatus, the mixer-settler has two or more washing stages with alkaline and acid washing stages alternating with each other.

In a further advantageous embodiment, the amount of the washing phase for recycling from the settling chamber can be influenced via the speed of the stirrer.

As a consequence of the invention, it is possible to avoid the previously necessary addition of the washing solution, for example of the sodium carbonate, which is far in excess of the actual requirement, for removing and neutralizing the decomposition products. By a controlled metered addition of the washing agent, only the actual requirement is adjusted to the particular operating conditions. The previous procedure in which an amount of $Na_2CO_3$ solution always had to be introduced in excess by a permanently set external phase ratio, assuming the most unfavorable conditions, can now be avoided. The requirement of washing agent is determined directly at the place where it is required and not at the location where the washing agent is discharged.

BRIEF DESCRIPTION OF THE DRAWING

The invention will now be described with reference to the single figure which shows a schematic of an embodiment of an apparatus according to the invention for carrying out an embodiment of the method of the invention for washing a solvent in the reprocessing of irradiated nuclear fuel.

DESCRIPTION OF THE PREFERRED EMBODIMENTS OF THE INVENTION

A two-stage mixer-settler 11 has a first stage 13 which includes a mixing chamber 17 and a follow-on settling chamber 21 and a second stage 15 which includes a mixing chamber 19 and a follow-on settling chamber 23. The lighter organic phase is transported from the first stage 13 over a weir 25 into the second washing stage 15. Each of the mixing chambers (17, 19) contains a stirrer (27, 29). A recycling line 31 recycles the washing phase from the settling chamber 21 into the mixing chamber 17 and ends beneath the stirrer 27. Likewise, a recycling line 33 recycles the washing phase from the settling chamber 23 into the mixing chamber 19 and ends beneath the stirrer 29.

The organic solvent to be washed is fed to the mixer-settler 11 from a reservoir tank 37 via a metering pump 35 into the mixing chamber 17, into which an alkaline washing solution is also introduced in a concentration range of from 0.1 to 0.5 mol/liter $Na_2CO_3$. This is effected via an in-line metering pump 39. A pH measuring probe 41 is located in the mixing chamber 17 and is connected to a constant-value controller 43 which acts via its output 45 on an actuator (motor 47) of the metering pump 39 in response to deviations in the range specified of between pH 8.5 and 10, so that the amount of sodium carbonate is added from a reservoir tank 49 until the pH is adjusted again to within the range specified.

Alkaline washing solution is drawn off at the bottom of the first washing stage 13 of the mixer-settler 11 and conveyed into a storage tank 51.

The second washing stage 15 of the mixer-settler 11 is configured for acid washing. For this, the acid washing solution for neutralization of the solution which has been subjected to alkaline washing is introduced in a concentration of 0.1 to 1.5 mol $HNO_3$. The pH in the mixing chamber 19 of the acid washing stage 15 is set in the range between pH 0 and 3. A pH measuring probe 59 in the mixing chamber 19 delivers its signal as a control quantity to the constant-value controller 61. Via its output 63, the constant-value controller acts on the actuator (motor 47) of a metering pump 65 in the event of deviations in the range specified of between pH 0 and 3, so that the amount of acid ($HNO_3$) is added from the reservoir tank 67 until the pH has been adjusted again to within the range specified.

The acid washing solution is drawn off at the bottom of the settling chamber 23 and conveyed to an intermediate tank 69.

The spent alkaline and acid washing solutions present in the tanks 51 and 69 are mixed with one another. A new process product, which again has two phases, is produced by the reaction. The decomposition products are neutralized and released by the mixing operation. The decomposition products are dissolved in the separated organic phase. The mixed solution is introduced into a separator 53 for separation into aqueous moderately active waste 55 and organic moderately active waste 57. The discharge 71 of the mixer-settler 11 is located at the side thereof and the washed solvent is here introduced into a tank 73 for further recycling.

It is understood that the foregoing description is that of the preferred embodiments of the invention and that various changes and modifications may be made thereto without departing from the spirit and scope of the invention as defined in the appended claims.

What is claimed is:

1. Method of washing an organic solvent in the reprocessing of irradiated nuclear fuel with a mixer-settler having two stages wherein two phases are mixed, the first mixer-settler stage including a mixing chamber and a settling chamber and the second mixer-settler stage also including a mixing chamber and a settling chamber, the method comprising the steps of:

metering the solvent to be washed to the mixing chamber of the first stage as one of the phases;

metering a first aqueous washing solution into the first stage at the mixing chamber thereof as the other one of the phases;

measuring the pH of the dispersion of said phases in said mixing chamber of the first stage to obtain a signal indicative of the pH value of the dispersion;

controlling the quantity of the first aqueous washing solution metered to the mixing chamber of the first stage in response to said signal for maintaining said pH-value within a predetermined range;

drawing off the first aqueous washing solution at the bottom of the first stage;

metering a second aqueous washing solution into the second stage at the mixing chamber thereof for neutralizing the solution which has been subjected to washing by said first aqueous washing solution;

drawing off the second aqueous washing solution at the bottom of said second stage; and, mixing the spent first and second aqueous washing solutions to form a new process product in the form of a mixed solution which again has two phases.

2. A method of claim 1, wherein the aqueous washing solutions flow to the settling chambers, and comprising the further step of recycling a portion of the aqueous wash phase from said settling chamber into said mixing chamber in each of said two stages.

3. The method of claim 2, wherein an internal phase ratio between the solvent and the washing solution is adjusted to be approximately 1:1 in each of said two stages.

4. The method of claim 1, wherein said first aqueous washing solution is an alkaline washing solution and said second aqueous washing solution is an acid washing solution.

5. The method of claim 4, comprising the further step of passing said process product into a separator for separating said process product into an aqueous moderately active waste and an organic moderately active waste.

6. The method of claim 4, comprising the further step of passing the washed solvent from the second stage of said mixer-settler into a tank for further recycling.

* * * * *